July 18, 1950

H. L. HARTLING 2,515,556

COMBINE HEADER CARRIER

Filed Oct. 13, 1947

Inventor

Homer L. Hartling

By *Clarence A. O'Brien and Harvey B. Jacobson*
Attorneys

July 18, 1950          H. L. HARTLING          2,515,556
COMBINE HEADER CARRIER
Filed Oct. 13, 1947          2 Sheets-Sheet 2
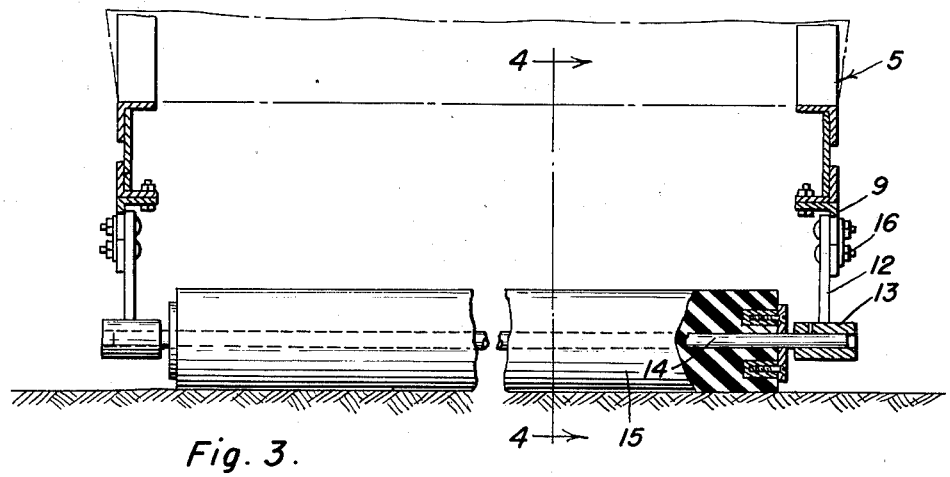
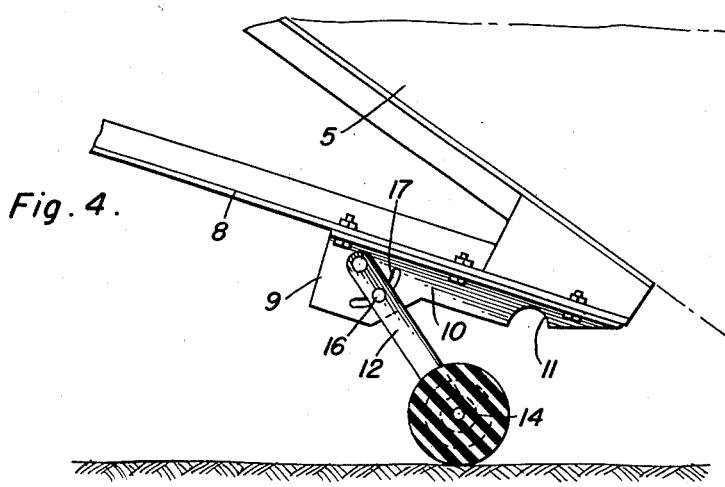
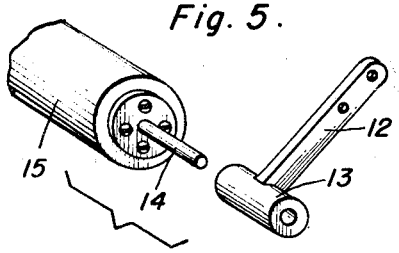
Inventor
Homer L. Hartling Patented July 18, 1950

2,515,556

UNITED STATES PATENT OFFICE 2,515,556

COMBINE HEADER CARRIER

Homer L. Hartling, Rockwell City, Iowa

Application October 13, 1947, Serial No. 779,439

1 Claim. (Cl. 308—15)

The present invention relates to new and useful improvements in carriers for combine headers to support the sickle at a desired cutting height.

More specifically the invention comprises a roller adjustably carried under the header immediately behind the sickle whereby as the roller travels over the ground the grain will be cut at a uniform height sufficiently low to gather all crop seed.

Among the more important objects of the invention is to provide a header carrier which reduces wear and damage to the combine parts by keeping the sickle out of the contact with the ground, thus eliminating picking up of soil, small stones and debris; which reduces the loss of low growing crop seed by keeping the sickle constantly at a desired height; and which relieves the operator of the necessity of constantly adjusting header lever to compensate for ridges, uneven and soft ground.

Another object is to provide an attachment of this character for combines which is simple and practical in construction, easy to attach to the combine without necessitating any changes or alterations in the construction thereof, efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is an enlarged sectional view taken on a line 3—3 of Figure 1.

Figure 4 is a transverse sectional view of the roller taken on a line 4—4 of Figure 3 and Figure 5 is a fragmentary group perspective view of one end of the roller and the mounting arm therefor.

Figure 1:
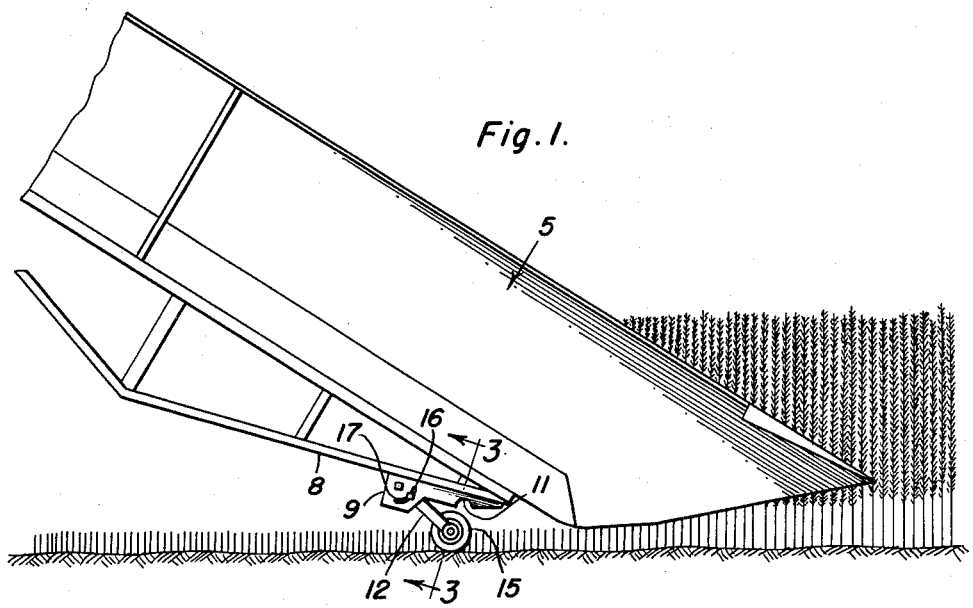
Figure 1 is a side elevational view.
Figure 2:
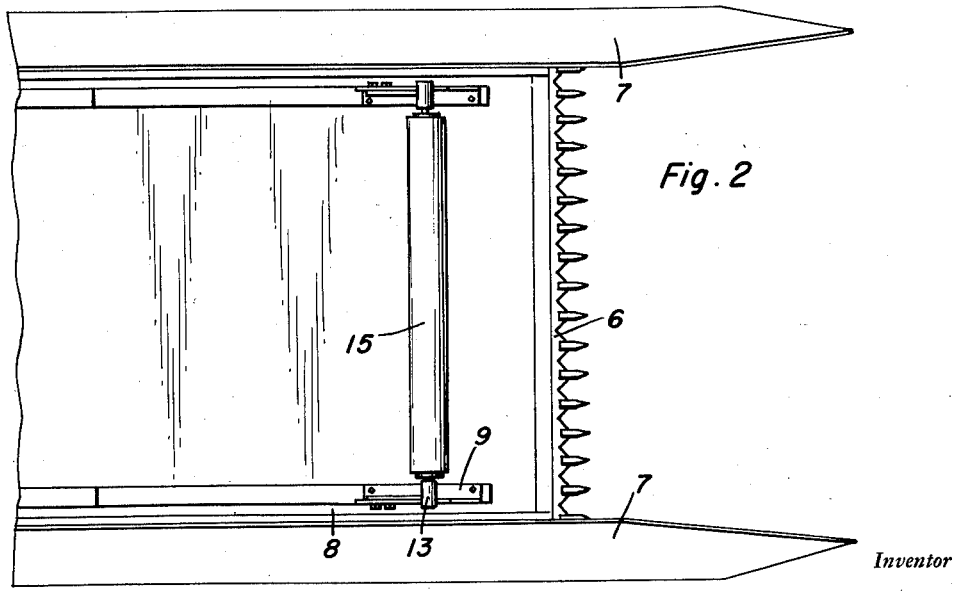
Figure 2 is a bottom plan view.

Referring now to the drawings in detail, wherein for the purpose of illustration I have disclosed a preferred embodiment of my invention, the numeral 5 designates a conventional combine header including the sickle 6 and side guards 7 supported on angle iron frames 8 at each side of the header.

Angle iron brackets 9 are suitably secured to the underside of the frames 8 to extend longitudinally under the header, the brackets including a downwardly extending flange 10 cut away at its front end and formed in its cutaway portion with a notch 11.

An arm 12 is pivoted at its upper end to the rear portion of flange 10 for vertical swinging movement, the lower end of the arm having a horizontal bearing 13 cast therewith. A shaft 14 has its ends journaled in the bearings at the sides of the header and on which is mounted a rubber roller 15.

The arm carries a bolt and nut 16 which extends through an arcuate slot 17 in the flange 10 to secure the arm and roller in a vertically adjusted position according to the height at which the grain is to be cut.

The notches 11 receive the bearings 13 to provide a maximum raising movement of the rollers without interference by the flanges 10.

In the operation of the device the usual header adjusting lever (not shown) is unlatched to allow the header to work freely and the header then rides on the roller 15. The header balance spring is adjusted to balance the weight of the header. By raising or lowering the arms 12 the sickle will be adjusted to cut the grain at a desired height.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A combine header carrier comprising a ground roller extending from side to side of said header and having end journal shafts, angle iron brackets secured to the bottom of the header at opposite sides thereof with flanges depending therefrom, a pair of arms having corresponding bearing ends in which said shafts are journalled, the other ends of said arms being pivoted to said flanges for vertical swinging to adjust said roller vertically toward and from the header to vary the height of the header from the ground, means for securing the arms against swinging, and bottom edge notches in said flanges for seating the shafts and limiting upward swinging of said arms together with upward adjustment of said roller, said notches providing for adjusting said roller upwardly close to said header.

HOMER L. HARTLING.

REFERENCES CITED

The following references are of record in the file of this patent:

UNITED STATES PATENTS

| Number | Name | Date |
|---|---|---|
| 99,634 | Chamberlain | Feb. 8, 1870 |
| 1,137,630 | Jones | Apr. 27, 1915 |
| 1,577,103 | Brown | Mar. 16, 1926 |
| 1,689,402 | Noack | Oct. 30, 1928 |